United States Patent [19]
Anderson

[11] 3,714,006
[45] Jan. 30, 1973

[54] CYCLOPENTADIENYLMANGANESE TRICARBONYL COMPOUNDS AS A CATALYST FOR THE RADIATION CURING OF POLYEPOXIDES

[76] Inventor: William S. Anderson, 6408 Irwin Court, Oakland, Calif. 94609

[22] Filed: May 15, 1972

[21] Appl. No.: 253,248

Related U.S. Application Data

[62] Division of Ser. No. 98,180, Dec. 14, 1970.

[52] U.S. Cl. ..........204/159.14, 96/115 P, 117/93.31, 260/18 EP, 260/47 EC, 260/78.4 EP, 260/79, 260/830, 260/835, 260/836 R, 260/837 R
[51] Int. Cl...............................B01j 1/10, B01j 1/12
[58] Field of Search.......204/159.14, 159.19, 159.24; 260/837 R

[56] References Cited

UNITED STATES PATENTS 3,497,488  2/1970  Dawans et al.....................252/431 R

*Primary Examiner*—Samuel H. Blech
*Assistant Examiner*—Richard B. Turer
*Attorney*—Martin S. Baer

[57] ABSTRACT

The cure of polyepoxide resins with a reactive acid anhydride or polymercaptan curing agent is accelerated in the presence of light and a catalytic amount of a cyclopentadienylmanganese tricarbonyl compound, e.g., methylcyclopentadienylmanganese tricarbonyl.

9 Claims, No Drawings

CYCLOPENTADIENYLMANGANESE TRICARBONYL COMPOUNDS AS A CATALYST FOR THE RADIATION CURING OF POLYEPOXIDES

This is a division, of application Ser. No. 98,180, filed Dec. 14, 1970.

BACKGROUND OF THE INVENTION

1. Field of the Invention

A polyepoxide resin is defined as any molecule containing more than one vic-epoxy group capable of being converted to a useful thermoset form. The conversion is accomplished by the addition of a chemically active compound known as a curing agent. Some curing agents promote curing by catalytic action, i.e., promote the polymerization of the polyepoxide resin to a homopolymer (one composed essentially of epoxy-resin molecules linked together through their own reactive sites). Other curing agents participate directly in the reaction and are chemically bound into the resin chain to produce a heteropolymer (one composed essentially of polyepoxide resin molecules linked together through the reactive sites of the curing agent). The present invention is directed to the preparation of heteropolymers of polyepoxide resins and reactive acid anhydride or polymercaptan curing agents.

2. Description of the Prior Art

Strohmeier et al., Z. Naturforsch, 21 b, 1119 (1966), disclose the polymerization of monoepoxides such as propylene oxide by ultraviolet irradiation in the presence of manganese carbonyls such as manganese decacarbonyl and cyclopentadienylmanganese tricarbonyl. However, this light-induced polymerization is conducted at elevated temperatures and in the absence of oxygen-containing gases such as air. The necessity of conducting the polymerization in the absence of air and at elevated temperatures severely limits its utility, particularly for surface coatings.

Light-sensitive catalysts for epoxy resin cures such as benzenediazonium fluoroborates (U.S. Pat. No. 3,205,157) and N-nitroso-alpha,beta-unsaturated amines (U.S. Pat. No. 3,074,869), which are not subject to inhibition by free-radical inhibitors such as oxygen, are known. However, such photocatalysts are expensive and suffer from short pot lives, i.e., they catalyze epoxy cures even in the absence of light.

SUMMARY OF THE INVENTION

It has been found that cyclopentadienylmanganese tricarbonyl compounds serve as photocatalysts for the cure of polyepoxide resins with acid anhydride or polymercaptan curing agents. For example, a mixture of diglycidyl polyether of Bisphenol A and a polymercaptan curing agent additionally containing a minor amount of methylcyclopentadienylmanganese tricarbonyl is cured in less than 10 hours at room temperature after exposure to light, but yet has a pot life in the dark of several weeks.

DESCRIPTION OF PREFERRED EMBODIMENTS

Generically, the photocatalyst comprises cyclopentadienylmanganese tricarbonyl compounds represented by the formula

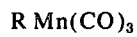

wherein R is a simple or substituted cyclopentadienyl radical containing from five to about 24 carbon atoms, preferably from five to 10 carbon atoms.

Exemplary cyclopentadienyl radicals include cyclopentadienyl; hydrocarbyl-cyclopentadienyl radicals such as methylcyclopentadienyl, dimethylcyclopentadienyl, ethylcyclopentadienyl, isopropenylcyclopentadienyl, laurylcyclopentadienyl, cyclopentylcyclopentadienyl, cyclohexenylcyclopentadienyl, benzylcyclopentadienyl; and substituted hydrocarbylcyclopentadienyl radicals such as methoxymethylcyclopentadienyl, p-cyanophenylcyclopentadienyl and (beta-acetoxyphenyl)cyclopentadienyl. Largely because of commercial availability, the preferred photocatalyst is methylcyclopentadienylmanganese tricarbonyl.

The photocatalysts of the process of the invention are employed for the cure of polyepoxide resins with acid anhydride or polymercaptan curing agents.

The polyepoxide resins used in preparing the curable compositions of the present invention comprise those organic materials which have more than one vic-epoxy group, i.e., a

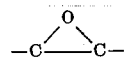

group, which group may be in a terminal position, i.e., a

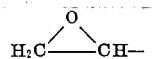

group, or in an internal position, i.e., a

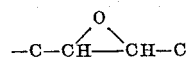

group. The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides include, among others,

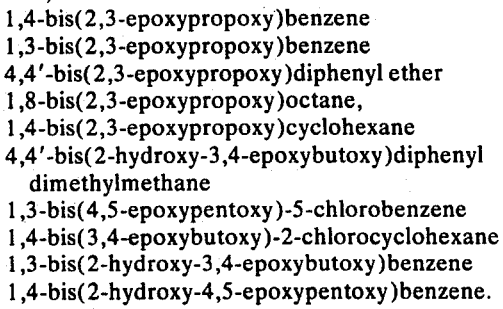

Other examples include the epoxy polyethers of polyhydric phenol. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2-bis(4-hydroxyphenyl)butane, 4,4'-dihydroxybenzophenone, bis(4-hydroxyphenyl)ethane, 2,2-bis(4-hydroxyphenyl)pentane, 1,5-dihydroxynaphthalene and phenolformaldehyde novolaks (phenol groups attached through methylene bridges).

Another group of polyepoxides comprises the polyepoxypolyethers obtained by reacting, preferably in the presence of an acid-acting compound, such as hydrofluoric acid, or of the halogen-containing epoxides, such as epichlorohydrin, with a polyhydric alcohol, and subsequently treating the resulting product with an alkaline component. As used herein and in the claims, the expressions "polyhydric alcohol" is meant to include those compounds having at least two free alcoholic OH groups and includes the polyhydric alcohols and their ethers and esters, hydroxy-aldehydes, hydroxy-ketones halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl)dimethylmethane and the like.

Particularly preferred members of this group comprise the glycidyl polyethers of aliphatic polyhydric alcohols containing from two to 10 carbon atoms and having from two to six hydroxyl groups and more preferably the alkane polyols containing from two to eight carbon atoms and having from two to six hydroxyl groups. Such products, preferably have an epoxy equivalency greater than 1.0, and more preferably, between 1.1 and 4 and a molecular weight between 300 and 1,000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate. Other suitable polyepoxides include polyglycidyl amines such as N,N-diglycidyl aniline and N,N-diglycidyl 2,4,6-tribromoaniline; low boiling polyepoxides such as diglycidyl ether, butadiene diepoxide, glycidyl glycidate and vinylcylohexene diepoxide; and triglycidyl isocyanurate.

Examples of polyepoxides having internal epoxy groups include, among others, the epoxidized esters of polyethylenically unsaturated monocarboxylic acids, such as epoxidized linseed, ethyl 9,12-octadecadienote, and octyl 9,12-octadecadienoate; the epoxidized esters of unsaturated alcohols having the ethylenic group in an internal position and polycarboxylic acids such as, for example, di(2,3-epoxybutyl)adipate, di(2,3-epoxypentyl)thiodipropionate, di(2,3-epoxybutyl)citrate and di-(4,5-epoxyoctadecyl)malonate; epoxidized esters of unsaturated alcohols and unsaturated carboxylic acids, such as 2,3-epoxybutyl 3,4-epoxypentanoate, 3,4-epoxycyclohexyl 3,4-epoxy cyclohexanoate, and 3,4-epoxycyclohexyl 4,5-epoxyoctanoate; epoxidized polymers and copolymers of diolefins such as butadiene; and bis(2,3-epoxycyclopentyl)ether.

Polyepoxides having an epoxy equivalent weight of between 100 and 200,000 are generally satisfactory, although polyepoxides having an epoxy equivalent weight of between about 100 and 2,000 are preferred. Particularly preferred polyepoxides are those formed from an epihalohydrin, and particularly epichlorohydrin, and a polyhydric phenol, such as 2,2-bis(4-hydroxyphenyl)propane.

The acid anhydrides employed in the process of the invention include monocyclic acid anhydrides such as succinic anhydride; bicyclic anhydrides such as hexahydrophthalic anhydride, methyltetrahydrophthalic anhydride, pyromellitic anhydride and phthalic anhydride; and polycyclic acid anhydrides such as methyl NADIC anhydride (maleic anhydride adduct of methylcyclopentadiene), chlorendic anhydride and alkylated endoalkylenetetrahydrophthalic anhydrides. Preferred acid anhydrides are polycyclic aliphatic acid anhydrides, especially methyl Nadic anhydride.

The polymercaptan curing agents employed in the curing process are compounds containing more than one mercapto, —SH—, group and include, among others, aliphatic polyol thiogylcolate esters such as 1,2,6-hexanetriol trithioglycolate; thio-trioxanes such as tris(mercaptomethyl)trioxane and tris (mercaptoethyl)trioxane; hydrocarbon dimercaptans such as dipentene dimercaptan (adduct of dipentene and $H_2S$; marketed by Phillips Petroleum); polymercaptans such as 4-(1-2-dimercaptoethyl)-1,2-cyclohexaned:thiol, 3,4,4'-tris(mercaptomethyl)dipentyl ether; and mercaptan-containing polysulfides prepared from sodium polysulfide and haloalkanes such as "LP–8" and "LP–3" marketed by Thiokol Corporation.

The amount of curing agent depends upon the number of active curing groups, e.g., mercapto or anhydride groups, present in the curing agent selected. In general, the curable composition comprises substantially stoichiometric amounts of polyepoxide resin and curing agent, i.e., about one equivalent of epoxy group of the epoxy resin for each equivalent of curing agent, an equivalent of curing agent being that sufficient to furnish one reactive curing group for each epoxy groups of the epoxy resin. Equivalent ratios of curing agent to epoxy groups of the epoxy resin in the range of from about 0.5:1 to 1:0.5 are satisfactory, although equivalent ratios, calculated on the same basis, from about 0.7:1 to 1:0.7 are preferred.

In certain modifications of the process mineral fillers, thermoplastic polymers, metal powders and leveling agents commonly used as additives in epoxy resin formulations may be included in the curable composition. Suitable additives which may be employed as desired, include among many others, aluminum powder, mica, bentonites, clays, synthetic resins and elastomers, ignited $Al_2O_3$, short-fiber asbestos, wood flours, carbon black, zinc dust, talc, silicone, and the like. Preferred additives are thermoplastic polymers. By "thermoplastic" is meant those polymers which melt when heated, say to temperatures above 200°F. A great variety of different materials are included in this group, such as, for example, polymers and copolymers of ethylenically unsaturated monomers such as ethylene, propylene, vinyl chloride, vinyl bromide, dichlorostyrene, acrylonitrile and vinyl acetate; polyester type resins, i.e., reaction products of polybasic acids such as terephthalic acid and polyhydric alcohols such as trimethylene glycol; and the polyamides such as nylon.

Of special importance are the nylons. Nylon as used herein is deemed to be the generally accepted usage of the term, i.e., the generic term for a class of polyamides containing separating amide groups (—CONH—), connected by methylene units (—$CH_2$—) in the polymer structure. The nylons are prepared by condensing a diamine with a dibasic acid. With the variety of diamines and dibasic acids available, many different types of nylons are possible. In general, all polyamides which are customarily called "nylon" are suitable for use in the present invention. The most common types in commercial use today are nylon 6, nylon 66 and nylon 610. These numbers represent a convenient method of designating the nylons according to the number of carbon atoms in the segments of the starting diamine and dibasic acid from which they are made. For example, nylon 66 is made from hexamethylenediamine and adipic acid, both of which contain 6 carbon atoms. Nylon 6 uses caprolactam, a cyclic acid amide $NH(CH_2)_5CO$ which contains six carbon atoms as its starting material. Nylon 610 is made from hexamethylenediamine and sebasic acid which contains 10 carbon atoms.

The quantity of additive used is dependent upon many factors such as cost, particle size, particle shape, absorption characteristics and loading volume. In general, however, the additives are employed in ratios up to 150 phr (parts per one hundred parts of polyepoxide).

In certain modifications of the process, it is also desirable to incorporate into the compositions to be cured minor amounts of a chemical free radical initiator as a catalyst promoter. The use of the chemical free radical initiator promotes a cure of uniform hardness, particularly in thick films of epoxy resins. Suitable free radical initiators include organic peroxides such as dicumyl peroxide, benzoyl peroxide, di-tert-butyl peroxide, cumene hydroperoxide and tert-butyl hydroperoxide and azo compounds such as alpha,alpha-azo-bis-isobutyronitrile and alpha,alpha-azo-bis-methylisobutyrate. The amount of catalyst promoters is not critical, and no catalyst promoters are required. When present, amounts of catalyst promoters up to about 10 phr (parts per one hundred parts of calculated on polyepoxde) are satisfactory.

The polyepoxide resin, curing agent, photocatalyst, additive, if any, and catalyst promoter, if any, are stirred or agitated to provide a substantially uniform liquid or solid mixture before curing. However, if the polyepoxide-containing mixture to be cured is semi-solid or solid, it may be convenient to employ a solvent which is inert to the reactants to provide a liquid curable mixture. Suitable solvents include ketones such as acetone and methyl ethyl ketone; ethers such as diethyl ether, diisopropyl ether, dimethoxyethane, tetrahydrofuran and CELLOSOLVE (mono- and dialkyl ethers of ethylene glycol); esters such as ethyl acetate and amyl acetate; halogenated alkanes such as methylene chloride and chloroform; and aromatic hydrocarbons such as toluene and xylene. Alternative, reactive diluents such as allyl glycidyl ether, phenyl glycidyl ether or butyl glycidyl ether may be blended with the polyepoxide-containing mixture to provide a liquid mixture.

The uncured mixtures of epoxy resin, curing agent, and photocatalyst are handled and stored in subdued light or darkness until they are to be cured. When curing is to take place, the compositions are exposed to electromagnetic radiation for an effective length of time, for example, from about 5 minutes upward to as much as 1 week. Electromagnetic radiation of wave lengths from 1 to 7,000 A., e.g., gamma rays, x-rays, ultraviolet and visible light, are suitable for initiating the cure. However, the ultraviolet to visible range (1,500 to 6,000 A.) is preferred. A commonly available radiation source which can be employed herein is direct sunlight inasmuch as the radiation of the sun contains ultraviolet light and visible light. Similarly, lamps which operate on the principle of a zinc, cadmium, thallium, gallium, indium, carbon, mercury, zirconium, hydrogen, deuterium, xenon or helium arc can likewise be employed in the exercise of the present invention. Preferred lamps for employment in the present invention include those commercially available high-pressure mercury arc lamps, pulsed xenon arc lamps and carbon arc lamps having a total power capacity ranging from about 50 watts to about 10,000 watts, preferably from about 1,000 watts to about 6,000 watts. These lamps emit a broad spectrum of light including ultraviolet and visible radiation. Likewise preferred are the low-pressure mercury lamps having a total power capacity ranging from about 0.5 watt to about 50 watts. These lamps emit monochromatic light generally in wave lengths of about 253.7 m or with the addition of suitable phosphors in the regions of 300 m and 355 m, for example. Other utilizable light sources are ordinary fluorescent lamps which emit in the 350 m region of the light spectrum. The lamps hereinbefore described are well known to those skilled in the art and are commercially available. These lamps are described in greater detail in "Ultraviolet Radiation" by L. R. Coller, 2nd edition, John Wiley & Sons, Inc. (1952), which disclosure is incorporated herein by reference.

The time required for the irradiation is generally a period of time from about 1 minute to about 100 hours, preferably from about 10 minutes to 8 hours. The reaction time varies with the concentration of the starting material in the solvent, the nature of the solvent, the intensity of the irradiation source, the physical reaction conditions, the temperature of reaction and the adsorption of the irradiation by the reaction vessel. However, the course of the reaction can readily be followed by conventional techniques, e.g., by determining the hardness of the cured composition.

Exposure to radiation for an effective length of time at substantially room temperature (25°C) produces a cure that is dry to the touch. However, the composition is optionally heated at a temperature ranging from 50°C to 250°C for about 1 hour to 3 days to accelerate and complete the cure. When acid anhydrides are employed as the curing agents, the cure is preferably completed by heating. The heat treatment is carried out separately or is carried on substantially simultaneously with the exposure to radiation.

Applications for the invention are in light sensitive printing plates, stamping tools, adhesives, decoration of metal, wood or plastic surfaces, preparing a perforated plastic sheet or fine mesh screen, photoresists for electronic circuits, chemical milling, holographic recording film, lithography, foamed-in-place resins, preparation of heat-shrinkable polyvinylchloride or nylon film, in cures at locations remote from a resin mixing pot but accessible to light, e.g., in oil wells.

Light-induced epoxy resin cures are particularly suitable for surface coatings, for example, as by applying a solution of the epoxy resin, curing agent and photocatalyst to a surface and exposing the coated surface to radiation. In certain instances, it might be desirable to shield various parts of the surface before exposing it to radiation. This is accomplished by masking predetermined portions of the surface with a layer of material having substantial opacity to prevent radiation from reaching the surface areas not requiring polymerization. To accomplish such masking, for example, shielding, e.g., a stencil, is placed on top of the surface. The radiation will penetrate the clear areas and cause polymerization. The opaque areas will block the radiation. After the exposure to radiation has been completed, the shielding, if any, is removed and the surface soaked in a solvent such as a chlorinated solvent or a ketone to remove the unpolymerized coating mixture from the shielded areas of the surface. After the soaking, the polymerization process is completed and the surface is ready for use.

Oxygen is a free-radical scavenger and generally free-radical initiated polymerizations must be conducted in the absence of oxygen or air. An advantage of the curing process of the invention is that it can be conducted in the presence of an oxygen-containing atmosphere. This advantage is of particular importance in surface coating applications wherein the epoxy composition to be cured is most conveniently applied in the open atmosphere.

EXAMPLE I

This example illustrates the preparation of a printing plate.

A tinplate panel was doctored at 150°C with a 2 mil coating of a mixture containing 81.5%wt EPON 1004 Resin (Bisphenol A) diglycidyl ether resin having an epoxy equivalent weight of 875–1,025 and an average molecular weight of about 1,400), 16.0%wt methyl NADIC anhydride [methylbicyclo(2.2.1)heptene-2,3-dicarboxylic anhydride] and 2.5%wt methylcyclopentadienylmanganese tricarbonyl. The panel was covered with a stencil, irradiated for one-fourth hour at room temperature with a water-cooled, high-pressure mercury arc lamp (General Electric AH–6) from a 30 cm distance and then baked at 125°C for 2 hours in a ventilated oven. The panel was soaked in methyl ethyl ketone and rubbed with steel wool to remove the unexposed (uncured) resin to produce the image of the stencil. Cured areas were unaffected by the methyl ethyl ketone or steel wool treatments.

In the dark, the above resin mixture has a pot life of several weeks.

EXAMPLE II

A cotton cloth was painted with a mixture containing 32.5%wt EPON Resin 1004, 6.5%wt methyl NADIC anhydride, 1%wt methylcyclopentadienylmanganese tricarbonyl and 60%wt tetrahydrofuran. The painted cloth was allowed to dry overnight. The cloth was covered with a stencil, irradiated with a water-cooled, high-pressure mercury arc lamp (General Electric AH–6) for one-fourth hour from a distance of 30 cm, and then baked at 125°C for 2.5 hours in a ventilated oven. The cloth was soaked in methyl ethyl ketone to remove the unexposed (uncured) resin. A sharp image of cured resin (corresponding to the image of the stencil) remained in the cloth.

EXAMPLE III

A variety of resin mixtures containing minor amounts of methylcyclopentadienylmanganese tricarbonyl catalyst were applied to a tinplate surface and cured by exposure to a General Electric AH–6 lamp. The resin mixture components, the film thickness, the irradiation time, the drying time (time at which film becomes dry to touch) and the pot life (time at which unexposed film becomes dry to the touch) are provided in Table I. In the Table, "A" designated EPON Resin 826, (glycidyl polyether of Bisphenol A having an average epoxide equivalent weight of about 175–190 and an average molecular weight of about 275), "B" designates EPON Resin 815 (glycidyl polyether of Bisphenol A having an average molecular weight of about 330 and an epoxide equivalent weight of about 175–195). "C" designates EPON Resin 154 (a glycidyl polyether prepared by condensing a phenol-formaldehyde novolak with epichlorohydrin and having an epoxide equivalent weight of 176–181). "D" designates EPON Resin 1001 (solid condensate of Bisphenol A and epichlorohydrin having an average molecular weight of about 900 and an epoxide equivalent weight of 450–550). "E" designates EPONOL Resin 55–B–40 (solid condensate of Bisphenol A and epichlorohydrin having an epoxide equivalent weight of about 200,000). The resin mixture of Run 16 contains 0.16 g of azo-bisisobutyronitrile and the resin mixture of Run 12 contains 0.37 g of dicumyl peroxide. The resin mixture of Run 17 contains 1.3 g of fumed silica (Cab-O-Sil). The resin mixture of Run 19

TABLE I

| Epoxy resin, g. | Curing agent, g. | Catalyst, g. | Solvent, g. | Film thickness, mils | Irradiation time, hrs. | Drying time, days at 25° C. | Pot life, days at 25° C. |
|---|---|---|---|---|---|---|---|
| "A", 5.0 | None | 0.07 | Cellosolve, 1.9 | 10–30 | 3 | >59 | >59 |
| "A", 1.29 | Hexanetriol trithioglycolate, 0.9 | 0.07 | None | 10 | 1.7 | <2 | 12 |
| "A", 5.0 | Hexanetriol trithioglycolate, 3.48 | 0.12 | Dimethoxyethane, 3.3 | 10–30 | 3 | 1 | 24 |
| "A", 2.29 | Hexanetriol trithioglycolate, 1.59 | 0.13 | Dimethoxyethane, 1.9 | 5 | 3 | 0.5 | >7 |
| "A", 4.63 | Tri(mercaptomethyl) diphenylether, 2.72 | 0.25 | Dimethoxyethane, 2.8 | 5 | 3 | 0.1 | >7 |
| "B", 3.70 | Tri(mercaptomethyl) diphenylether, 2.18 | 0.20 | Dimethoxyethane, 3.0 | 5 | 3 | 0.1 | >7 |
| "D", 5.0 | Tri(mercaptomethyl) diphenyl ether, 1.1 | 0.21 | Dimethoxyethane, 3.1 | 5 | 3 | 0.1 | >7 |
| "C", 1.8 | Dipentenedimercaptan, 0.14 | 0.14 | None | 10 | 1.7 | <2 | 12 |
| "C", 3.6 | Dipentenedimercaptan, 2.0 | 0.1 | Cellosolve, 4.4 | 5–10 | 3 | 0.5 | 11 |
| "C", 3.6 | Dipentenedimercaptan, 2.0 | 0.10 | Butanol, 2.2 | 5–10 | 3 | 0.5 | 20 |
| "A", 3.70 | Pentaerythritoltetrathioglycolate, 2.38 | 0.30 | None | 10 | (a) | 1 | |
| "A", 3.70 | Pentaerythritoltetrathioglycolate, 2.38 | 0.30 | None | 10 | (b) | 1 | |
| "A", 2.0 | Dodecylsuccinic anhydride, 2.4 | 0.24 | Dimethoxyethane, 1.58 | 10 | 3 | 11 | >36 |
| "A", 5.0 | Methyl nadic anhydride, 4.8 | 0.135 | Dimethoxyethane, 3.8 | 10–30 | 3 | 12 | >25 |
| "A", 2.0 | Methyl nadic anhydride, 1.9 | 0.20 | Dimethoxyethane, 1.4 | 10 | 3 | 1 | 22 |
| "A", 2.0 | Methyl nadic anhydride, 1.9 | 0.20 | Dimethoxyethane, 1.4 | 10 | 3 | 11 | 26 |
| "C", 7.1 | Polysulfide, 12.C | 0.51 | None | 10 | 0.25 | 1 | 10 |
| "E", 12.5 | Methyl nadic anhydride, 1.0 | 0.25 | Methyl ethyl ketone, 12.5 | 10 | 0.25 | (c) | >100 |
| "A", 2.0 | Methyl nadic anhydride, 2.0 | 0.5 | Methanol, 90 | 10 | 0.25 | (c) | >100 |
| "A", 1.0 | Methyl nadic anhydride, 2.0 | 0.25 | Tetrahydrofuran, 45 | 10 | 0.25 | (c) | >100 |
| "D", 10.0 | Polysulfide, 6.0 | 0.4 | None | 2 | 0.25 | 1 | 10 | a 5 minutes.   b 6 minutes.   c 2 hours, 125° C.

contains 10 g of nylon (ZYTEL 61, an alcohol-soluble nylon containing nylon-6, nylon-66 and nylon-610 units). The resin mixture of Run 20 contains 5 g of polyvinylchloride. The polysulfide curing agent of Runs 17 and 21 is prepared from sodium polysulfide and dichloroethane and trichloropropane and is marketed as LP-8 by Thiokol Corp. (see Schildknecht, *Polymer Processes*, Vol. 10, Interscience, 1956 p. 475).

I claim as my invention:

1. A process for curing an epoxy composition comprising a polyepoxide resin having a vic-epoxy equivalency greater than one, a curing agent selected from the group consisting of acid anhydrides and polymercaptans and a catalytic amount of a cyclopentadienylmanganese tricarbonyl compound which comprises exposing said composition to electromagnetic radiation wherein the equivalent ratio of curing agent to epoxy groups of the polyepoxide resin is in the range of from about 0.5:1 to 1:0.5.

2. The process of claim 1 wherein the electromagnetic radiation is in the 1,500–6,000 A. range.

3. The process of claim 1 wherein the polyepoxide resin is a glycidyl polyether of a polyhydric phenol.

4. The process of claim 3 wherein the phenol is 2,2-bis(4-hydroxyphenyl)propane.

5. The process of claim 3 wherein the phenol is a phenol-formaldehyde novolak resin.

6. The process of claim 3 wherein the curing agent is an aliphatic polycyclic acid anhydride.

7. The process of claim 6 wherein the mixture is heated simultaneously or subsequent to exposure to electromagnetic radiation at a temperature of about 50° to 250°C.

8. The process of claim 7 wherein the curing agent is methylbicyclo(2.2.1)heptane-2,3-dicarboxylic acid anhydride.

9. The process of claim 8 wherein the cyclopentadienylmanganese tricarbonyl is methylcyclopentadienylmanganese tricarbonyl.

* * * * *

PO-1050
(5/69)

UNITED STATES PATENT OFFICE
CERTIFICATE OF CORRECTION

Patent No. 3,714,006   Dated January 30, 1973

Inventor(s) WILLIAM S. ANDERSON

It is certified that error appears in the above-identified patent and that said Letters Patent are hereby corrected as shown below:

Cover sheet between line [76] and line [22] insert

-- [73] Assignee: Shell Oil Company, New York, N.Y. --.

Signed and sealed this 26th day of February 1974.

(SEAL)
Attest:

EDWARD M. FLETCHER, JR.
Attesting Officer

C. MARSHALL DANN
Commissioner of Patents